(12) United States Patent
Pafumi et al.

(10) Patent No.: US 8,819,190 B2
(45) Date of Patent: Aug. 26, 2014

(54) MANAGEMENT OF FILE IMAGES IN A VIRTUAL ENVIRONMENT

(75) Inventors: James A. Pafumi, Leander, TX (US); George James Romano, Rochester, MN (US); Jacob Jason Rosales, Austin, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 13/071,414

(22) Filed: Mar. 24, 2011

(65) Prior Publication Data

US 2012/0246642 A1 Sep. 27, 2012

(51) Int. Cl.
*G06F 15/177* (2006.01)

(52) U.S. Cl.
USPC ............ 709/220; 709/208; 709/221; 709/222; 709/226

(58) Field of Classification Search
USPC .................................................. 709/222, 226
See application file for complete search history.

(56) References Cited

U.S. PATENT DOCUMENTS

| | | | | |
|---|---|---|---|---|
| 5,996,024 | A * | 11/1999 | Blumenau | 719/326 |
| 6,463,504 | B1 * | 10/2002 | Ishibashi et al. | 711/114 |
| 6,470,446 | B1 * | 10/2002 | Beelitz et al. | 713/2 |
| 6,748,429 | B1 * | 6/2004 | Talluri et al. | 709/221 |
| 7,363,514 | B1 * | 4/2008 | Behren | 713/2 |
| 2004/0243650 | A1 * | 12/2004 | McCrory et al. | 707/203 |
| 2006/0095708 | A1 * | 5/2006 | Sater et al. | 711/172 |
| 2006/0107000 | A1 * | 5/2006 | Jung-Ik et al. | 711/153 |
| 2006/0123024 | A1 | 6/2006 | Sathyanarayan | |
| 2006/0259730 | A1 * | 11/2006 | Gimpl et al. | 711/173 |
| 2006/0294515 | A1 * | 12/2006 | Gimpl et al. | 717/174 |
| 2007/0083653 | A1 * | 4/2007 | Chandrasekaran et al. | 709/225 |
| 2007/0271438 | A1 * | 11/2007 | Lee et al. | 711/173 |
| 2008/0155243 | A1 * | 6/2008 | Diep et al. | 713/2 |
| 2008/0189468 | A1 * | 8/2008 | Schmidt et al. | 711/6 |
| 2008/0201709 | A1 * | 8/2008 | Hodges | 718/1 |
| 2009/0222496 | A1 * | 9/2009 | Liu et al. | 707/204 |
| 2009/0327643 | A1 * | 12/2009 | Goodman et al. | 711/173 |
| 2010/0049931 | A1 * | 2/2010 | Jacobson et al. | 711/162 |

(Continued)

OTHER PUBLICATIONS

Hanselman, Scott, "How-To: Installing Windows Virtualization Services (Hypervisor) on Windows Server 2008 RC0", Sep. 27, 2007, retrieved from <http://www.hanselman.com/blog/HowToInstallingWindowsVirtualizationServicesHypervisorOnWindowsServer2008RC0.aspx>.*

*Primary Examiner* — Emmanuel L Moise
*Assistant Examiner* — Sarah Drabik
(74) *Attorney, Agent, or Firm* — Yudell Isidore Ng Russell PLLC

(57) ABSTRACT

A method, system, and computer program product provides effective management and deployment of image files within a Virtual Input/Output (I/O) Server (VIOS) cluster. An Image Management (IM) utility utilizes a discovery process to establish connections with objects in order to manage these objects. Following discovery of an ICP client, the IM utility enables creation of a virtual server partition and initiates the importing of a captured image to a VIOS cluster Storage Pool (SP). The IM utility creates logical units (LUs) within the Image Management Fileset (IMF) for each file within the captured image. The IM utility maps the LUs to the VIOS Cluster SP using unique image file handles. The IM utility configures the new storage that comprises the created LUs. The IM utility copies image files to the appropriate storage device/LU. When import/copy of the image is completed, the IM utility activates the virtual server partition.

19 Claims, 13 Drawing Sheets

(56) References Cited

U.S. PATENT DOCUMENTS

2010/0191946 A1* 7/2010 Cheston et al. .................. 713/2
2011/0213753 A1* 9/2011 Manmohan .................. 707/640
2012/0005672 A1* 1/2012 Cervantes et al. ................ 718/1
2012/0005673 A1* 1/2012 Cervantes et al. ................ 718/1
2012/0084381 A1* 4/2012 Alladi et al. .................. 709/213
2012/0089972 A1* 4/2012 Scheidel et al. .............. 717/168

* cited by examiner

MANAGEMENT OF FILE IMAGES IN A VIRTUAL ENVIRONMENT

BACKGROUND

1. Technical Field

The present invention relates in general to clustered data processing systems and in particular to management of image files within a clustered data processing system. Still more particularly, the present invention relates to an improved method and system for managing the storage and distribution of image files within a clustered data processing system.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. However, within the virtualization computing environment, storage virtualization and management is implemented as a separate virtualization model from server virtualization and management. Thus, different client logical partitions (LPARs) associated with different virtualized server systems may access the same storage access network (SAN) storage.

Furthermore, to operate effectively these client partitions require efficient access to resources and capabilities. The requirements of client partitions presents challenges regarding storage allocation, fine grain security, serialization, scheduling and file management issues, which a conventional implementation of distributed server systems is not prepared to effectively address. In addition, these conventional systems are ill-equipped to resolve the complex issues involved with providing storage pooling, distributed storage, and consistent storage virtualization interfaces and capabilities across heterogeneous SAN and network attached storage (NAS).

BRIEF SUMMARY

Disclosed are a method, system, and computer program product for utilizing cluster-awareness to effectively manage image files within a Virtual Input/Output (I/O) Server (VIOS) cluster. An Image Management (IM) utility executing on a processor of a management console utilizes a discovery process to establish connections with objects of the VIOS cluster, such as VIOSes and other devices, in order to manage these objects. Following discovery of an image capture program (ICP) client, the IM utility allows a user/VIOS to create a virtual partition and initiates the import of a captured image to a VIOS cluster Storage Pool (SP). The IM utility creates logical units (LUs) within the Image Management Fileset (IMF) for each file within the captured image. The IM utility maps the LUs to the VIOS cluster SP using unique image file handles. The IM utility configures the new storage that comprises the created LUs. The IM utility copies image files to the appropriate storage device/LU. When import of the image is completed, the IM utility activates the virtual server partition (or client logical partition).

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
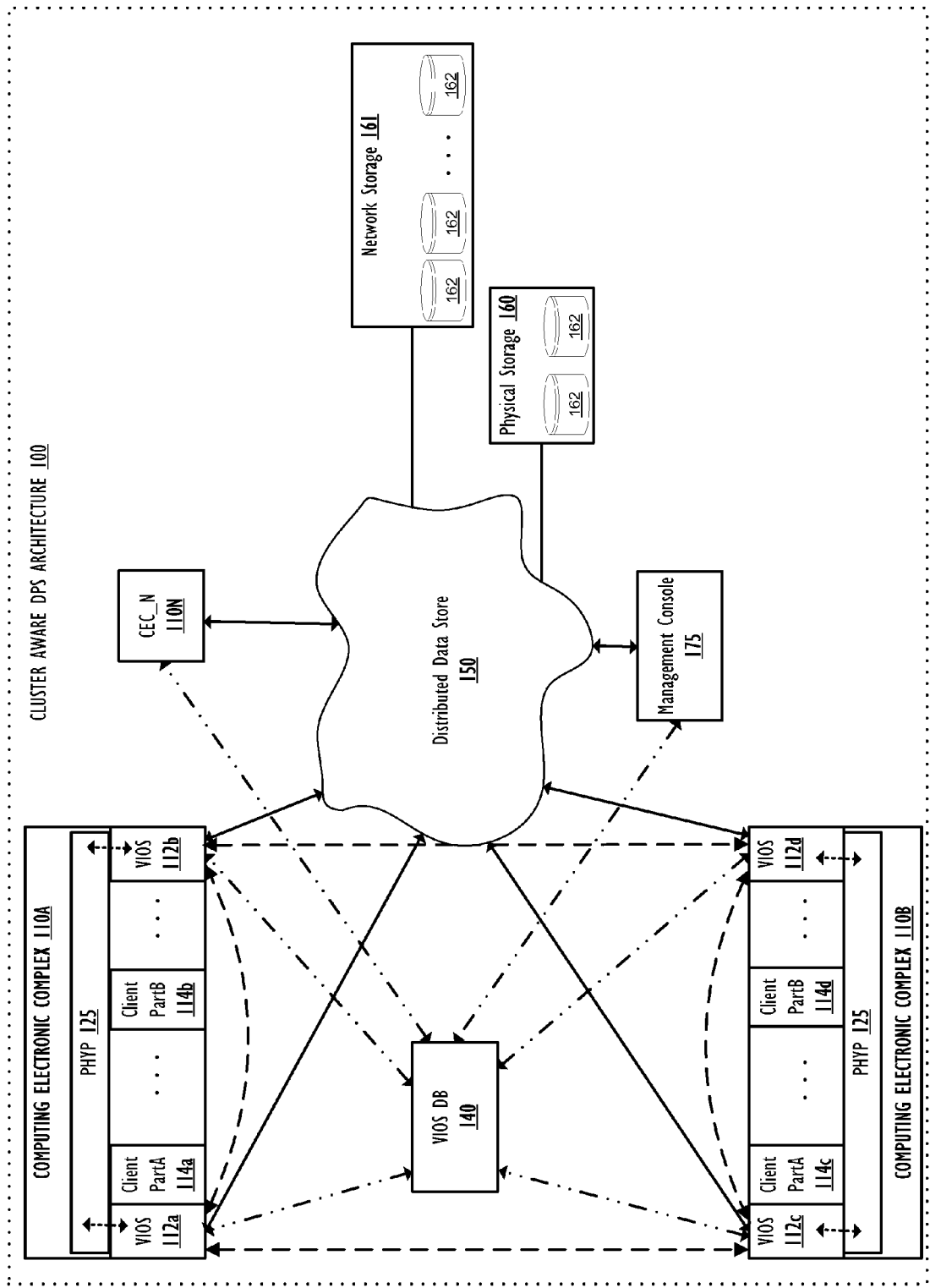
FIG. 1A illustrates a first view of a cluster (aware) data processing system within which various of the functional features of the described embodiments are implemented, according to one embodiment.

The illustrative embodiments provide a method, data processing system, and computer program product for utilizing cluster-awareness to effectively manage image files within a Virtual Input/Output (I/O) Server (VIOS) cluster. An Image Management (IM) utility executing (as a director server) on a processor of a management console utilizes a discovery process to establish connections with objects of the VIOS cluster, such as VIOSes and other devices, in order to manage these objects. Following discovery of an image capture program (ICP) client, the IM utility allows a user/VIOS to create a virtual partition and initiates the importing of a captured image to a VIOS cluster Storage Pool (SP). The IM utility creates logical units (LUs) within the Image Management Fileset (IMF) for each file within the captured image. The IM utility maps the LUs to the VIOS cluster SP using unique image file handles. The IM utility configures the new storage that comprises the created LUs. The IM utility copies image files to the appropriate storage device/LU. When import of the image is completed, the IM utility activates the virtual server partition (or client logical partition).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and sub-headings are presented within the specification:

A. General Architecture
    B. Cluster-Aware VIOS
    C. VIOS Cluster Communication Protocol
    D. VIOS Shared DB for Cluster Management
    E. Management of File Images in a Virtual Environment A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed data store 150, and the distributed data store 150 enables several of the client level functional features provided by the embodiments described herein. Distributed data store 150 is a distributed storage facility providing a single view of storage that is utilized by each CEC 110 and for each client 114 of each CEC 110 within a cluster-aware, distributed system. Distributed data store 150 comprises local physical storage 160 and network storage 161, both of which comprise multiple physical storage units 162 (e.g., disks. solid state drives, etc.). The physical disks making up distributed data store 150 may be distributed across a storage network (e.g., a storage area network (SAN)). Additionally, distributed data store 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed data store 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed data store 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to Distributed data store 150 via CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed data store 150. As utilized herein, references to one or more "nodes", are assumed to refer specifically to a VIOS within the cluster. DPS 100 also comprises a management console 175 on which a management tool (not shown) executes.

Figure 1B:
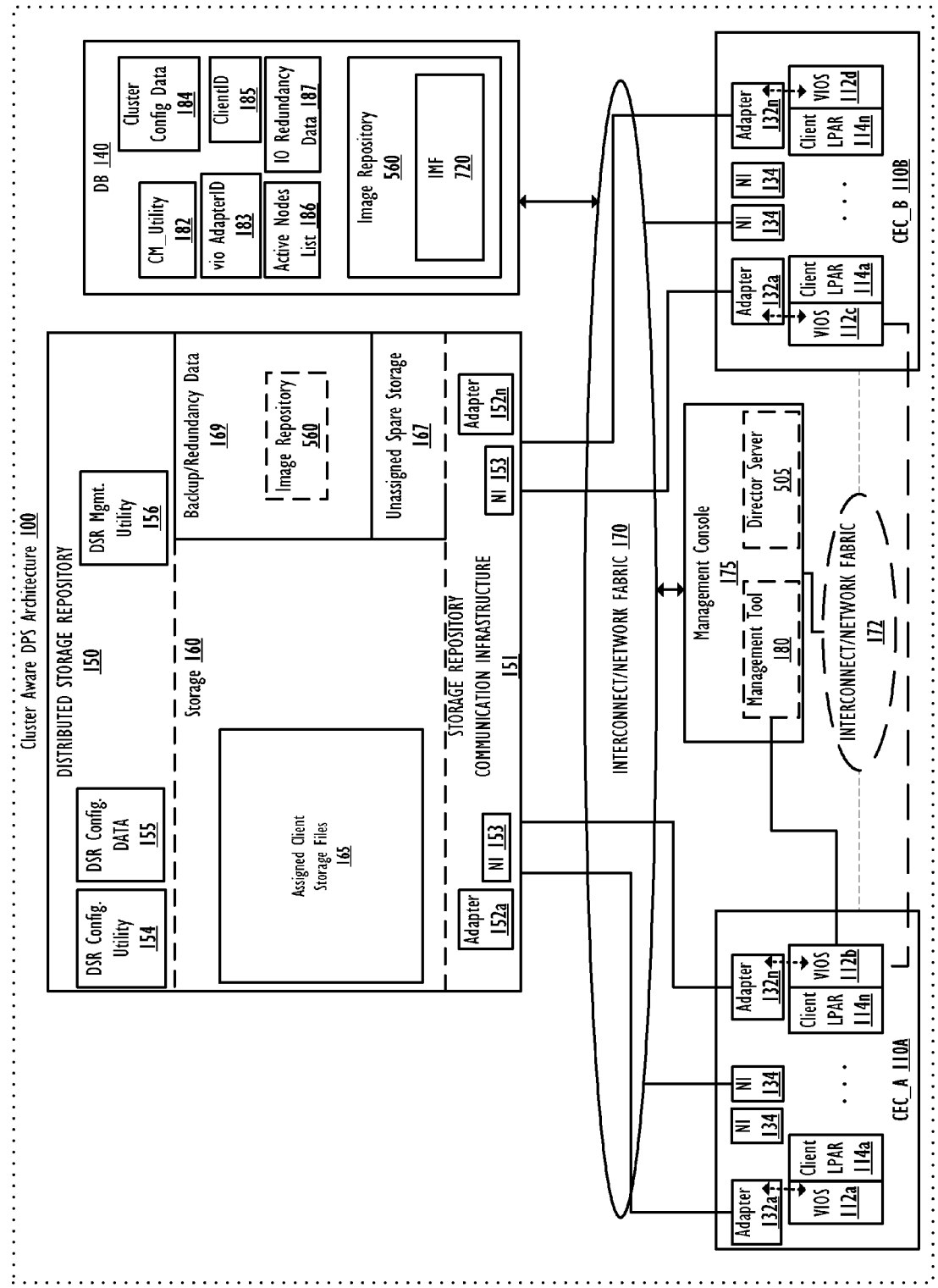
FIG. 1B illustrates a second view of the cluster data processing system (DPS) of FIG. 1 depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

As depicted, each CEC 110 comprises one or more network interfaces 134 and one or more I/O adapters 132a-n to enable the CEC 110 and thus the other components (i.e., client partitions) of the CEC 110 to engage in network level communication. Each VIOS 112 emulates virtual client I/O adapters 226 to enable communication by specially-assigned client LPARs 114a-114n with distributed storage repository 150 and/or other clients, within the same CEC or on a different CEC. The VIOSes 112 emulate these virtual I/O adapters 226 and communicates with distributed storage repository 150 by connecting with corresponding virtual sever I/O adapters (SVA) 152a-152n at distributed storage repository 150. Internal CEC communication between VIOS 112 and client LPARs 114a-114n are illustrated with solid connecting lines, which are routed through the virtualization management component, while VIOS to server communication is provided by dashed lines, which connect via the network/interconnect fabric 172. Management console 175 is utilized to perform one or more management functions within the VIOS cluster, in one or more embodiments. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data (157) with DB 140 to support the cluster management functions described herein.

Also illustrated by FIG. 1B is an initial view of the component make-up of an example distributed storage repository 150 and an initial listing of some components of DB 140. To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110.

Figure 7A:
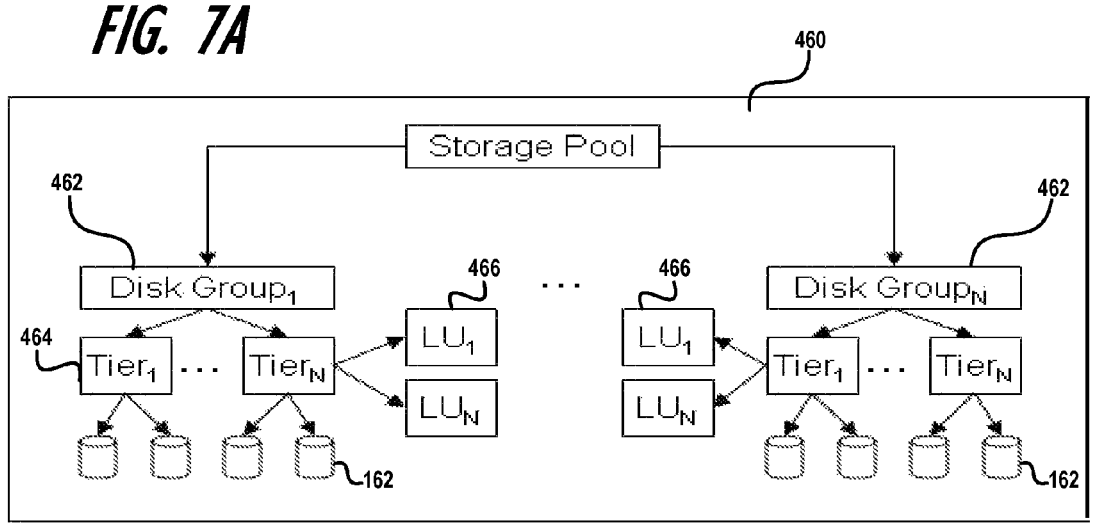
FIG. 7A is a block diagram representation of a storage pool associated with and utilized by a VIOS cluster within a CA_DPS, according to one embodiment.

As shown, distributed data store 150 generally comprises general storage space 160 (the available local and network storage capacity that may be divided into storage pools) providing assigned client storage 165 (which may be divided into respective storage pools for a group of clients), unassigned, spare storage 167, and backup/redundant CECNIOS/client configuration data storage 169 (which may further include backup/redundant data for an Image Repository 560 of DB 140). In one embodiment, the assigned client storage is allocated as storage pools, and several of the features related to the sharing of a storage resource, providing secure access to the shared storage, and enabling cluster-level control of the storage among the VIOSes within a cluster are supported with the use of storage pools. When implemented within a VIOS cluster, storage pools provide a method of logically organizing one or more physical volumes for use by the clients supported by the VIOSes making up the VIOS cluster. FIG. 7A illustrates an example configuration of a storage pool utilized within a cluster aware DPS 100. Specifically, FIG. 7A provides details on how these physical volumes are used within the storage pool. As shown, storage pool 460 within the cluster contains one or more Disk Groups 462. Disk Groups 462 provide administrators the ability to provide access policies to a given subset of physical volumes 162 within the storage pool 460. Once a disk group 462 has been defined, administrators can further categorize the subset into Storage Tiers 464 based on disk characteristics. Once a Disk Group 462 and Storage Tier 464 have been defined, administrators carve Logical Units (LU) 466 to be exported to client partitions (114).

With the capability of virtual pooling provided herein, an administrator allocates storage for a pool and deploys multiple VIOSes from that single storage pool. With this implementation, the SAN administration functions is decoupled from the system administration functions, and the system administrator can service customers (specifically clients 114 of customers) or add an additional VIOS if a VIOS is needed to provide data storage service for customers. The storage pool may also be accessible across the cluster, allowing the administrator to manage VIOS work loads by moving the workload to different hardware when necessary. With the cluster aware VIOS implementation of storage pools, additional functionality is provided to enable the VIOSes to control access to various storage pools, such that each client/customer data/information is secure from access by other clients/customers.

As illustrated, DSR 150 further comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, DPS 100 also comprises VIOS database (DB) 140, in which is stored various data structures generated during set up and/or subsequent processing of the VIOS cluster-connected processing components (e.g., VIOS es and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. In the present embodiment, VIOS DB 140 also comprises an image repository 560 which contains an image management file set (IMF) 720 by which the nodes of the VIOS cluster are able to import/export file images and deploy these file images to VIOS partitions and/or client partitions within the VIOS cluster. Additional features of DB 140 and distributed storage repository 150 as well as the specific components or sub-components that enable the various clustering functionality are presented within the description of the remaining figures and throughout the description of the various presented embodiments.

The various data structures illustrated by the figures and/or described herein are created, maintained and/or updated, and/or deleted by one or more operations of one or more of the processing components/modules described herein. In one embodiment, the initial set up of the storage pools, VIOS DB 140 and corresponding data structures is activated by execution of a cluster aware operating system by management tool 180 and/or one or more VIOSes 112. Once the infrastructure has been established, however, maintenance of the infrastructure, including expanding the number of nodes, where required, is performed by the VIOSes 112 in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 can include director server 505, and both can be implemented within management console 175. However, it is appreciated that (resources of) any node within DPS 100 may be selected/elected to perform the functions of management tool 180 and/or director server 505 and the selected node would then perform one or more of the below described cluster creation and the other cluster monitoring and management functions, utilizing the availability of the resources provided by DB 140 and distributed storage repository 150.

In an alternate embodiment, Director server 505 is an executable module that is executed within a client partition at one of the CECs within DPS 100. In one embodiment, the Director server 505 controls the image management operations of the cluster and enables each node within the cluster to establish connections with objects, including configuring storage devices to enable import and export of file images. In one embodiment, director server 505 deploys an image capture program (ICP) client to a VIOS 112b and to enable the VIOS to perform the various image management functions.

Figure 2:
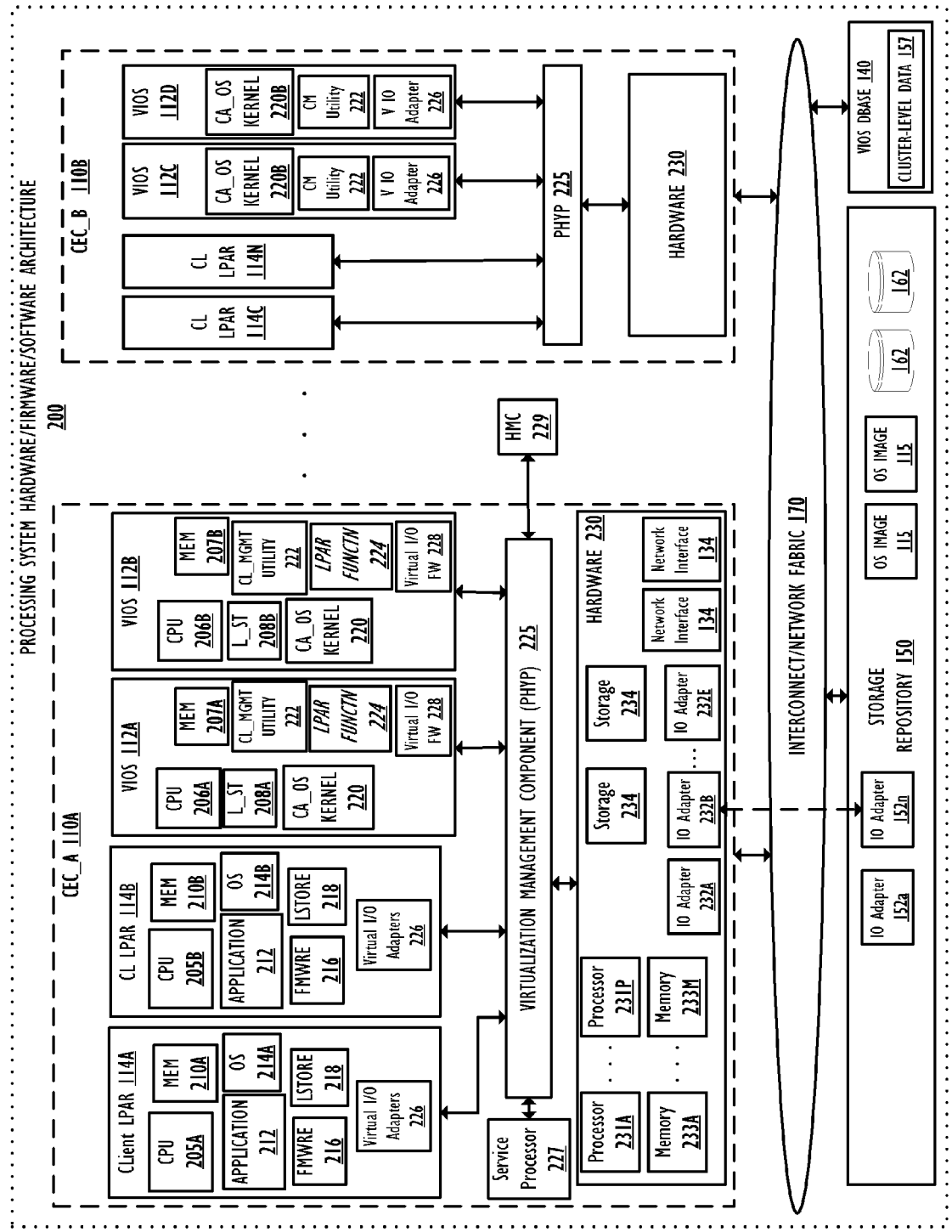
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC _A 110A). CEC _A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions. In one or more embodiments, configuration data related to the virtualized adapters and other components that are assigned to the VIOSes (or the clients supported by the specific VIOS) are maintained within each VIOS and may be maintained and updated by the VIOS OS, as changes are made to such configurations and as adapters are added and/or removed and/or assigned.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. HMC 229 is one possible implementation of the management console 175 illustrated by FIGS. 1A-1B, and the use of HMC 229 specifically within this illustration is solely for illustration of one actual embodiment among several available options. Operations of the different logical partitions may be controlled through HMC 229, which is a separate data processing system from which a system administrator may perform various functions, such as reallocation of resources to different logical partitions. Importantly, features related to backup and restoration of OS partitions and in particular of the VIOSes and the VIOS cluster are controlled through the HMC, in the present embodiment, but those features are described more generally with reference to the management console 175 in the various other embodiments presented herein.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, Application 212, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (vSCSI) target and shared network adapter capability to client LPARs 114 within CEC 110. As provided herein, VIOS 112 supports virtual real memory and virtual shared storage functionality (with access to distributed storage repository 150) as well as clustering functionality. Relevant VIOS data and cluster level data are stored within local storage (L_ST) 208 of each VIOS 112. For example, in one embodiment VIOS configuration data of the local VIOS hardware, virtual and logical components. Additionally, local storage (L_ST) 208 comprises cluster configuration data 184, cluster state data 185, active nodes list 186.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B, and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices and grants access to Distributed data store 150 in cooperation with the PHYP 225. Configuration of the VIOS is performed through the hardware management tools of HMC 229. SCSI storage devices support a set of commands that allow SCSI initiators the ability to control access to storage. Data base programs, for example, may manage access to distributed data store 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking. These I/O resources may be presented as internal or external SCSI or SCSI with RAID adapters or via Fibre-Channel adapters to Distributed data store 150. The client LPAR 114, however, uses the virtual SCSI device drivers. In one embodiment, the VIOS 112 also provides disk virtualization for the client LPAR by creating a corresponding file on distributed data store 150 for each virtual disk. The VIOS 112 allows more efficient utilization of physical resources through sharing between client LPARs, and supports a single machine (e.g., CEC 110) to run multiple operating system (OS) images concurrently and isolated from each other.

As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. CA_OS 220 manages the VIOS LPARs 112 and enables the VIOSes within a cluster to be cluster aware. An example CA_OS kernel can comprise several functional modules, in one embodiment, including cluster management (CM) utility which supports the VIOS configuration for cluster-level functionality. The CA_OS can also comprise additional modules; however, each of these additional software components may be a functional module within CM utility, in one embodiment, and can be described as such throughout the remainder of this specification. In one embodiment, CM utility 222 may be a separate utility that is locally installed or downloaded (from DB 140, for example) as an enhancement to an existing OS within a CEC 110. CM utility 222 is then executed when configuring VIOS to join a cluster and become a cluster-aware node within the cluster, and CM utility enables the OS to support the various cluster-awareness and other cluster-level features and functionality. In an alternate embodiment, CA_OS 220 includes all the clustering features and functionality and rolls out the various features when the CEC 110/VIOS 112 joins the cluster and/or during configuration of VIOS 112 to become cluster-aware.

According to one embodiment, cluster-awareness enables multiple independent physical systems to be operated and managed as a single system. When executed within one or more nodes, CA_OS 220 enables various clustering functions, such as forming a cluster, adding members to a cluster, and removing members from a cluster, as described in greater detail below. In one embodiment, CM utility 222 may also enable retrieval and presentation of a comprehensive view of the resources of the entire cluster. It is appreciated that while various functional aspects of the clustering operations are described as separate components, modules, and/or utility and associated data constructs, the entire grouping of different components/utility/data may be provided by a single executable utility/application, such as CA OS 220. Thus, in one embodiment, CA_OS executes within VIOS 112 and generates/spawns a plurality of functional components within VIOS 112 and within DB 140. Several of these functional components are introduced within FIG. 1B, and others are described throughout the various embodiments provided herein. For simplicity in the descriptions which follow, references to cluster management utility and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed data store 150 and/or DB 140. Virtual I/O adapter(s) 226 and CM utility 222 also enable the VIOS 112 to provide each client LPAR 114 with access to the full range of storage accessible within distributed data store 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running.

C. VIOS Cluster Communication Protocol

One embodiment provides a communication protocol that enables efficient communication between the Clients 114 and distributed data store 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed data store 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed data store 150, the first client can avoid accessing the same storage resource that is concurrently being utilized by the second client, thus preventing data integrity issues, which would potentially cause data corruption and client partition crashes.

The communication protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 3:
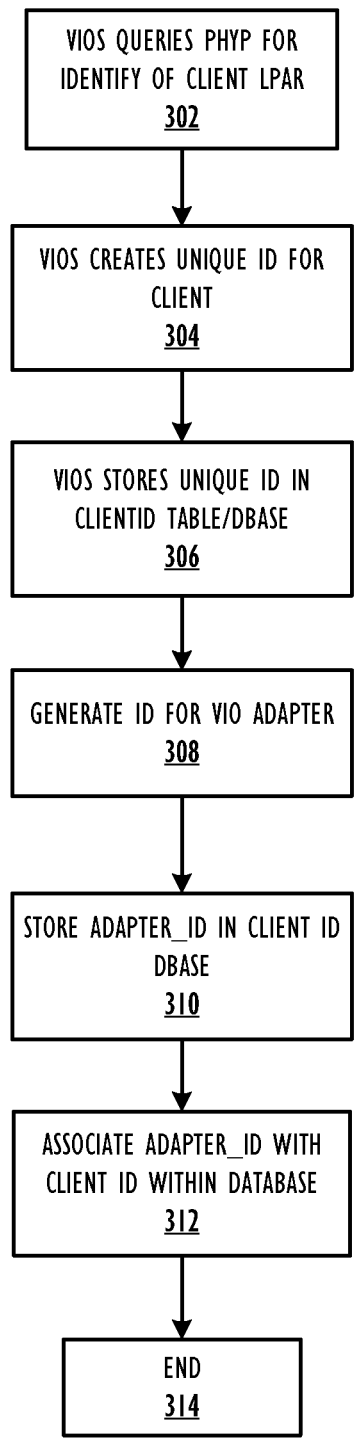
FIG. 3 is a flow chart of the method by which the process of client creation and registration is completed within a CA_DPS, according to one embodiment.
Figure 4:
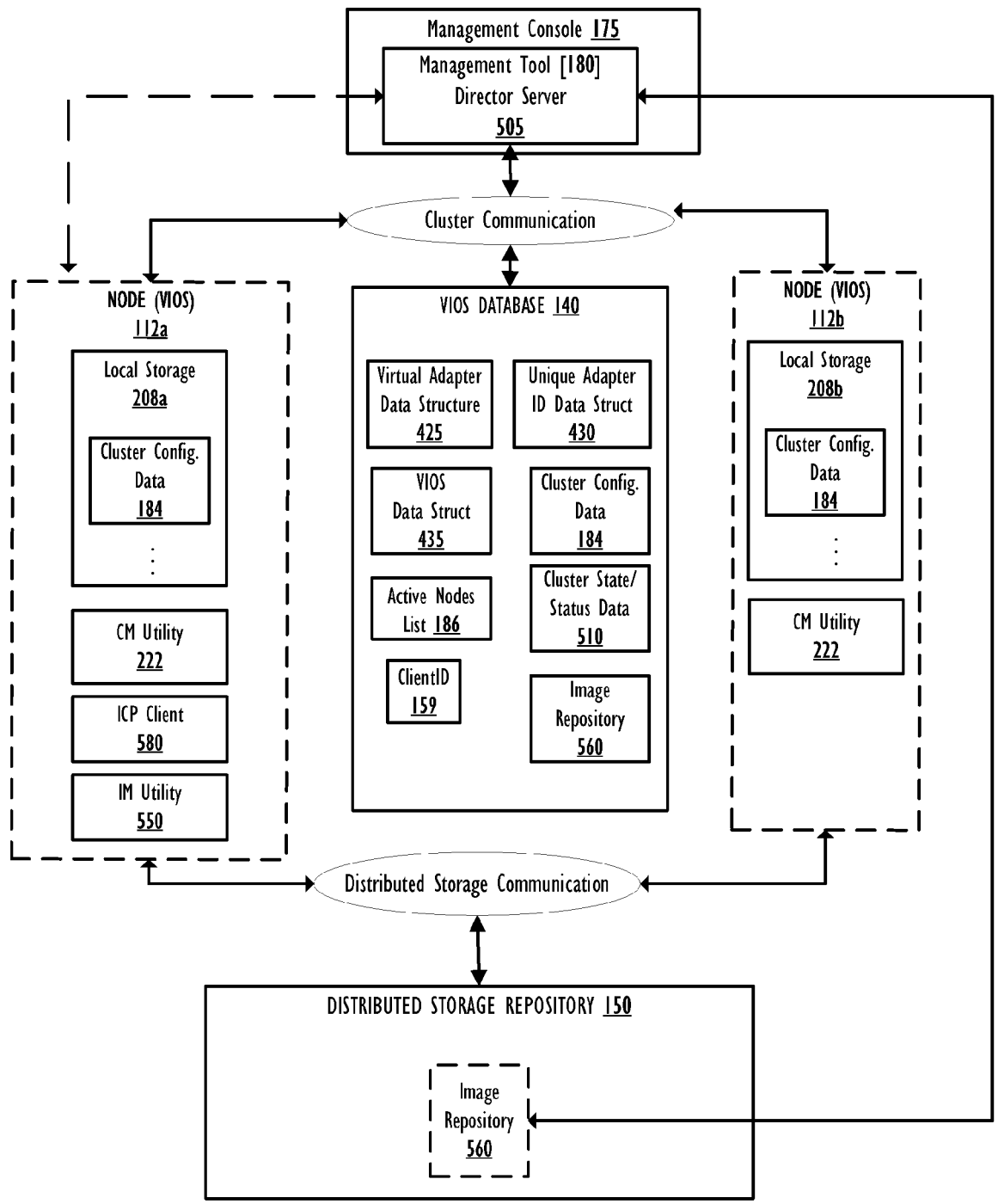
FIG. 4 is a block diagram representation of stored data structures and other functional components within a VIOS DB including various node components, which enable cluster level image management and exchange between a director server (management tool), one or more VIOSes, image capture program (ICP) client, and the shared database, according to one embodiment.

According to the described implementation, the different clientID-vioAdapterID pairings are unique throughout the cluster, so that no two clients throughout the entire cluster can share a same virtual adapter and no two vioAdapterIDs are the same within a single client. FIG. 3 is a flow chart illustrating the method by which a VIOS 112 on a CEC 110 with DPS 100 enables cluster level communication between a client LPAR 114 and distributed data store 150, according to one embodiment. The process begins at block 302 at which the VIOS 112 queries PHYP 225 for the identity of the client LPAR 114. At block 304, the VIOS 112 creates a unique identifier (ID) for the client (i.e., a ClientID). The VIOS 112 then stores the unique ClientID in ClientID data structure 159 (FIG. 4) within DB 140 (block 306). The DB 140 and by extension the ClientID data structure 159 are accessible to each VIOS partition in the cooperating cluster (DPS 100). At block 308, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapterID data structure 430 (block 310) and are associated with their corresponding clientIDs (block 312). The method illustrated by FIG. 3 ends at termination block 314, with each clientID having been associated with the corresponding one or more vio AdapterIDs with DB 140. FIG. 4 described below illustrates these data structures as well as several of the other components stored within DB 140.

VIOS SCSI emulation code (an executable module provided by VIO software utility 228) utilizes the vioAdapterID to emulate reserve commands. Secure access to storage pools are managed by the unique ClientID, which is provided on an access list associated with each storage pool. In one embodiment, the VIOS 112 supports commands that are invoked as part of moving a client LPAR 114 from a first (source) CEC (110A) to a second (destination) CEC (110B) in a cluster environment. The commands generate data streams describing the virtual devices, which include the vio Adapter information. That information is used to modify the ClientID database 159 so that the identity of the Client on the destination CEC (110B) is associated with the unique ClientID of that client, and the unique identifiers of the VIO adapters (VIO AdapterIDs) on the source CEC (110A) are inherited by the I/O adapters on the destination CEC (110B).

D. VIOS Shared DB for Cluster Management

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the corresponding ODM entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local mode is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

FIG. 4 is a block diagram representation of stored data structures and other functional components within a VIOS DB including various node components, which enable cluster level image management and exchange between a Director server, one or more VIOSs, ICP client the shared database, according to one embodiment. In one embodiment, a local copy of DB 140 is shared by each VIOS within the cluster. Each VIOS is then responsible for storing, maintaining and updating the data structures at DB 140 in one embodiment. As illustrated by FIG. 4, DB 140 is accessible to the various VIOS nodes 112 and to director server 505. Database 140 comprises several different modules of data, which may be arranged in a plurality of formats (e.g., tables, raw data, sequenced data, etc.). According to the figure, DB 140 includes a virtual adapter data structure 425, which maintains a listing of and configuration information about the virtual adapters. DB 140 also includes a second data structure 430 that holds the unique adapter identifiers (AdapterIDs), and is therefore referred to herein as AdapterID data structure 430. DB 140 maintains a listing of and information about the VIOSes within a VIOS data structure 435. In one or more embodiments, each of the described data structures 425-435 can be or can include a table within DB 140. VIOS DB 140 also includes a persistent reserve state data 510. In one embodiment a copy of the persistent reserve state data can be maintained at distributed storage repository 150.

When a virtual adapter is first discovered, the cluster management (CM) utility 122 (FIG. 1B) creates a row within the virtual adapter data structure 425 and a row within the unique AdapterID data structure 430. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. The kernel extension is passed the AdapterID and utilizes the AdapterID to identify the IT Nexus, thus allowing the VIOS cluster to limit access to storage based on the reserve commands. This scheme allows software designed to access physical devices (e.g., SCSI devices) to operate with security, without requiring any modification. This scheme further allows the customer to have access to a full suite of existing software solutions that are familiar to system administrators. The kernel extension is also tasked with sending a message through a socket once the kernel discovers the identity of a VIOS on VIOS login. The VIOS uses a SCSI standard login command, which is part of a protocol known as SRP. The SRP protocol is emulated over the PHYP transport layer by the VIOS. The SRP login can be used as a trigger to send a command over a socket with the CEC relative identity of the VIOS. A message is sent back to the kernel extension once the message is processed. The message triggers access to DB 140, which access checks if the VIOS is known. If the VIOS is not known within the cluster, a unique identifier is assigned to the VIOS and a row is inserted in the VIOS data structure 435 within DB 140. The created adapter row of the adapter data structure 425 in DB 140 is associated with this row of the VIOS data structure 435. The management tool validates that the VIOS has access rights to the storage pools in use by the adapter to emulate logical units. In the described embodiments, the kernel extension does not allow I/O access to logical units making use of restricted storage pools until the VIOS identity is verified.

Among the principal functional features of the illustrative embodiments is the ability to cluster the VIOSes 112 of the various CECs 110 within the DPS 100 (FIG. 1A-1B). Additionally, VIOS provides clustering services that can be exposed to have operations be invoked not only on the local VIOS, but on remote nodes without the consumer being aware of such actions. The introduction of these technologies requires the consumers, namely a management tool, such as Systems Director (or director server 505) in one embodiment, to be able to understand what capabilities a VIOS currently is running with when the VIOS is part of a cluster, and what the VIOS is potentially capable of running FIG. 4 further illustrates the communication between a management tool 180, such as Systems Director of IBM Corporation, and the VIOS nodes within the DPS 100.

E. Management of File Images in a Virtual Environment

According to the presently described embodiments, a utility is provided on the CEC to enable support for the ICP agent/client in managing images and objects associated with a virtual server partition. The Image Management (IM) utility executes within a CEC from which a VIOS creates a virtual partition and initiates the import of a captured image to a VIOS Cluster SP. When import of the image is completed, the IM utility activates the virtual server partition. According to one embodiment, the IM utility 550 is implemented on the director server 505 and/or from the management console 175. Other embodiments can provide for the IM utility to be located within or associated with the PHYP 225.

IM utility 550 provides code/program instructions that are executed on one or more virtual processor resources of one or more VIOSes 112 within CEC 110 to provide specific functions. Among the functionality provided when IM utility 550 is executed and which are described in greater detail herein are the following non exclusive list: (a) deploying an ICP agent to a VIOS; (b) discovering the ICP agent; (c) triggering creation of a virtual server partition based on ICP discovery; (d) establishing connections with objects, such as systems or devices, in order to manage these objects; (e) capturing one or more file images from within an image repository within a storage pool, where the file images have one or more files that can be subsequently imported by the first VIOS to the virtual storage device; (f) importing the captured file images; (g) deploying the imported images to the virtual server partition; and (h) activating virtual server partitions with the imported images.

Figure 5:
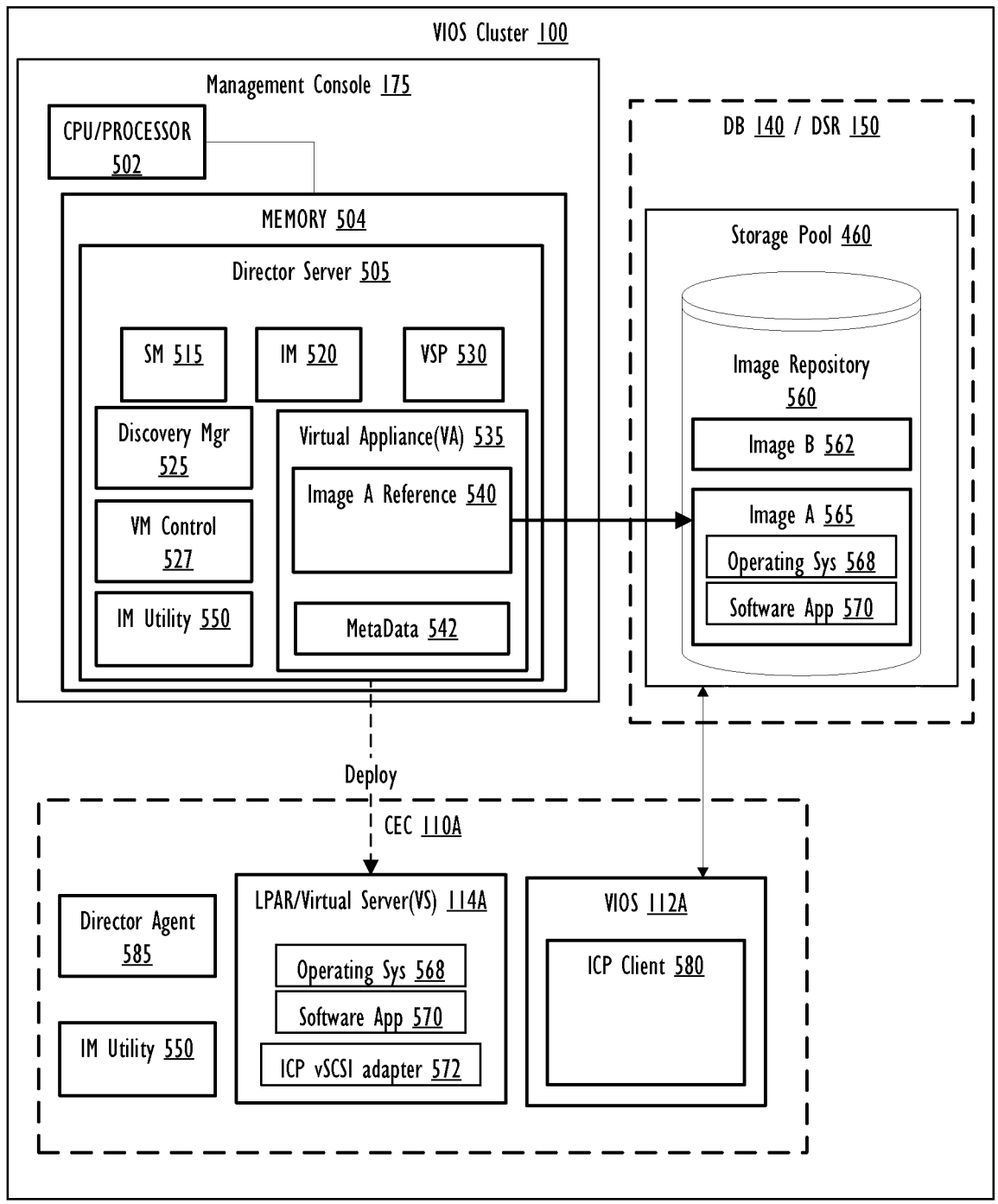
FIG. 5 illustrates a VIOS cluster (i.e., a cluster aware collection of VIOSes) that is configured to effectively manage image files within a VIOS cluster, according to one embodiment.

Turning now to FIG. 5, there is illustrated an example VIOS cluster (i.e., a cluster aware collection of VIOSes) that is configured to effectively manage image files within a VIOS cluster, according to one embodiment. According to one or more embodiments, the algorithms/functional software modules provided by Image Management (IM) utility 550 also account for the discovery of objects, such as systems or devices, in order to manage these objects. IM utility 550 enables a VIOS to trigger creation of a virtual server which is associated with these managed objects. Each VIOS within the VIOS cluster (DPS 100) can be considered a node in the cluster.

E1. Image Management (IM) Flows

As provided herein, discovery is the process by which the director server 505 identifies (via a connection to one or more VIOSes of the VIOS cluster) objects, such as systems or devices, and establishes connections with these objects that the director server can manage. Before the director server can manage a system or device, the object must be discovered by the director server. The management server also stores the addresses of discovered managed objects in the director servers' local database. In the director server paradigm, agent-initiated discovery occurs when managed systems contact the director server rather than director server searching for managed systems. Thus the embodiments present a push-based discovery. In the director server paradigm, server-initiated discovery occurs when the director server searches the network for managed systems. In the described embodiments, server-initiated discovery is referred to simply as discovery.

Figure 7B:
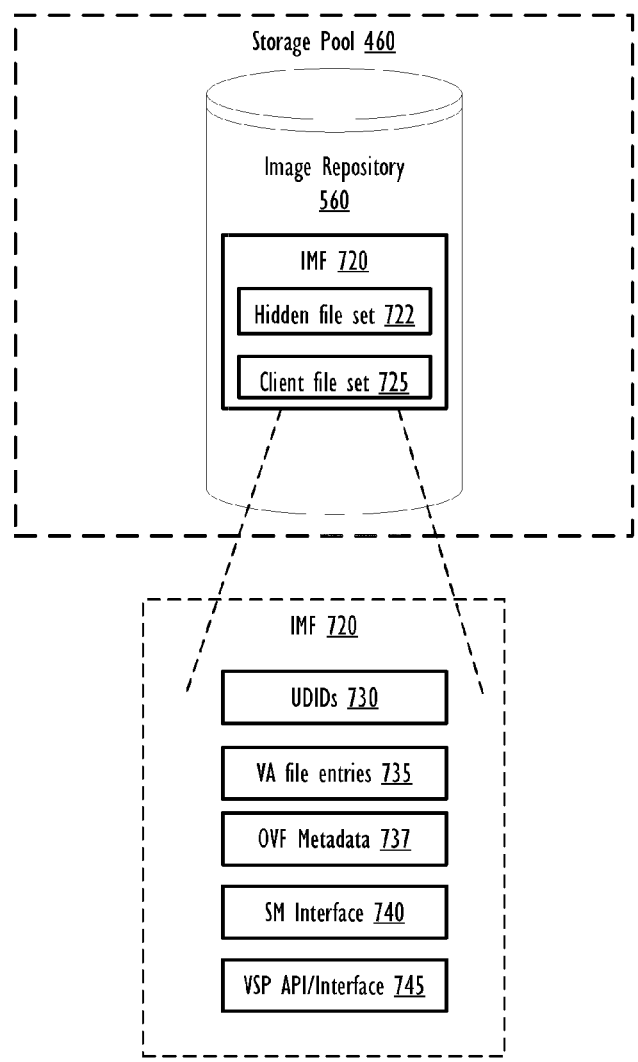
FIG. 7B is an illustration of a VIOS Storage Pool that includes an image management fileset (IMF), according to one embodiment.

IM utility 550 triggers/detects discovery (image) flows in response to discovery of ICP client/agent 580. To enable/configure ICP discovery, director server 505 deploys ICP client 580 and activates the client (e.g., VS partition or client logical partition) when necessary. Throughout the description, references to VS partition is understood to refer to a client logical partition (LPAR), such as client LPAR 114A. In one embodiment, IM utility 550 triggers discovery flows (i.e., message and/or data flows) in response to discovery of VIOS cluster Storage Pool (SP) 460. FIG. 7B is an illustration of a VIOS cluster Storage Pool that includes an image management file (IMF), according to one embodiment. In one embodiment, ICP discovery triggers VIOS SP discovery. During ICP and/or VIOS SP discovery, IM utility 550 determines whether VIOS SP 460 (which may simply be referred to as SP 460) contains image repository 560 that may provide an image file set (e.g., Image A 565). If there is an IMF, for example, IMF 720, in SP 460, IM utility 550 determines if one or more of a storage manager/management (SM) interface (e.g., SM interface 740) and a virtualization sphere (VSP) interface (e.g., VSP API/interface 745) is present within IMF 720. IM utility 550 uses SM 515 and VSP 530 via SM interface 740 and VSP interface 745, respectively, to get the unique name of a file set. In particular, IM utility 550 determines if there are (file) images for Virtual Appliance (VA) 535 present and identifies the files in IMF 720 that represent elements/components of the VA entries/image set 735.

Storage Manager (SM) 515 returns/provides a list of file identifier "handles" (unique device identifiers "UDIDs" 730) to IM utility 550. Each identifier represents space in IMF 720 that is allocated for a captured or imported image file within the set of "VA images". If there is no image file set in VIOS SP 460, then IM utility 550 creates via SM 515 a new/unique image file set in VIOS SP 460.

The VSP provides an application programming interface (API) to create a LU specific to image management. The LU is created in an Image Management File set (IMF). In one embodiment, the API is a superset of a createLU API. The VSP API provides a relative path parameter as well as a fileset name, and fileset label. The name and label may be the same the pathname, which is a concatenation of name and relative path and is configured to be unique. For example, one may consider a relative path of "linux", the name "1234565" and a label of "redhat_030901". The pathname in this case is "linux/123456". The relative path allows image manager to organize the image repository and/or logically create multiple repositories. The path is relative to the image repository which is created (by default) by the VIOS. The VSP provides an API to copy one LU to another LU. The VSP can provide an API to clone an LU, which implicitly creates a new LU.

FIGS. 6, 8-12 are flow charts illustrating various methods by which the above processes of the illustrative embodiments are completed. Although the methods illustrated in FIGS. 6, 8-12 may be described with reference to components and functionality illustrated by and described in reference to FIGS. 1-5 and 7 it should be understood that this is merely for convenience and alternative components and/or configurations thereof can be employed when implementing the various methods. Certain portions of the methods may be completed by IM utility 550 executing on one or more (virtual) processors (CPU 206A) within VIOS 112 (FIG. 1 or 2) or on processing resources of management tool 180/Director 505 (within management console 175) or DB 140. The executed processes then control specific operations of or on CECs 110, client LPARs 114, VIOSes 112, DB 140 and/or distributed data store 150. For simplicity is describing the methods, all method processes are described from the perspective of either/both IM utility 550 and VIOS/node 112.

E2. Import of Image via ICP

Figure 6:
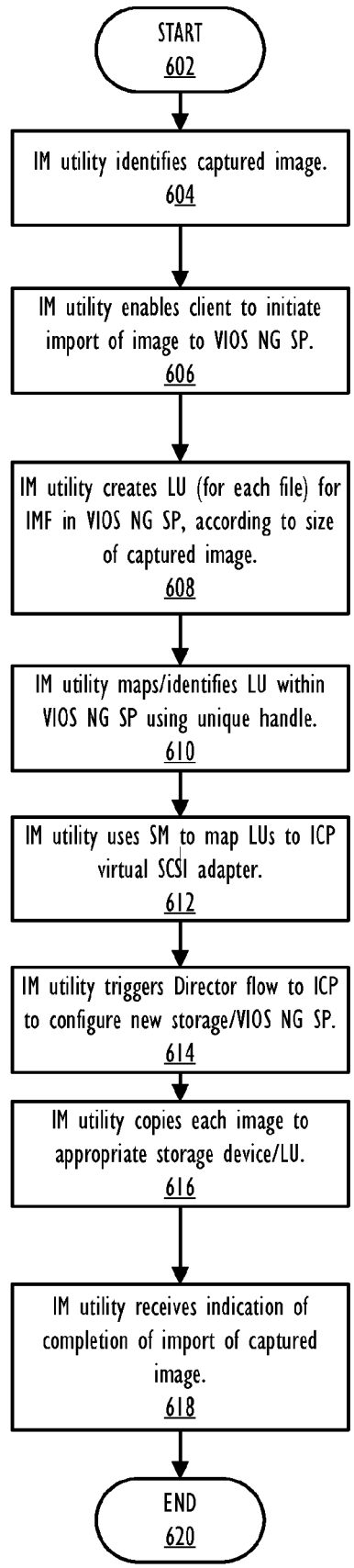
FIG. 6 is a flow chart illustrating the method by which file images are imported to the storage pool, according to one embodiment.

FIG. 6 is a flow chart illustrating the method by which file images are imported to the storage pool (460), according to one embodiment. The method begins at initiator block 602 and proceeds to block 604 at which IM utility 550 identifies, during ICP discovery, a captured image (e.g., Image A 565). The captured image is intended for subsequent deployment to a corresponding Virtual Server (VS), for example, VS 114A. IM utility 550 enables a user/client (e.g., VIOS 112A) that initiates creation of VS 114A to import the captured image to VIOS cluster Image Management Fileset (IMF) 720.

In order to initiate import of the captured image to VIOS IMF, IM utility 550 initiates a flow from director agent 585 to SM 515 in order to create a LU (e.g., LU 466) in IMF 720 for each file that is captured, as shown at block 606. At block 608, SM 515 uses the appropriate VSP API to create the LU in IMF 720, according to the size of the captured image. At block 610, IM utility 550 "attaches"/maps LU 466 in SP 460 to VIOS cluster server using a unique device identifier/handle (UDID) 730. At block 612, IM utility 550 initiates a flow to SM 515 so that SM 515 calls VSP 530 to map all the LU(s) (e.g., 466) in the disk group (e.g., 462) to ICP virtual SCSI adapter 572. IM utility 550 initiates a private Director flow to ICP 580 which configures the new storage/LU(s), as shown at block 614. Director agent 585 identifies the storage devices/LU(s) to ICP 580 by UDID 730. At block 616, IM utility 550 initiates a copy of each image to the appropriate storage device. At block 618, ICP 580 signals completion of the import of the captured image to IM utility 550. The process ends at block 620.

When all the files for the image have been imported, IM utility 550 proceeds to create the VA for repository 560. IM utility 550 creates, in repository database, entries for the VA that include the open virtualization format (OVF) metadata 737 and a database entry 735 for VA 535 for each file that is allocated for VA 535. These database entries include the OVF metadata handle for the file(s) and the unique handle for image files that were provided when the files were allocated. When the appropriate entries are placed in the repository, IM utility 550 creates Virtual Appliance 535 in director 505. As a result, IM utility 550 creates Software Image (e.g., Image A 565) in director 505 for every image file that makes up the Virtual Appliance 535.

E3. Exporting of Image from ICP

Export (image) flow forwards image files from within the VIOS SP. The export flow occurs in a direction opposite to an import flow (which sends files to the VIOS SP). In the export flow, the image files are created by a caller (i.e., the client that initiates or "calls for" the export flow) and read through a file stream on the ICP.

IM utility 550 uses SM 515 to access image files (via unique handles) in VIOS SP image file set. In one embodiment, IM utility 550 uses SM 515 to issue a command (e.g., deployVMD) to deploy a virtual machine device (VMD) to obtain mapping for target image files in the VIOS SP image file set. Then IM utility 550 triggers an "undeployVMD" command to remove/cancel the deployment in order to unmap the IMF associated with the image export.

Figure 8:
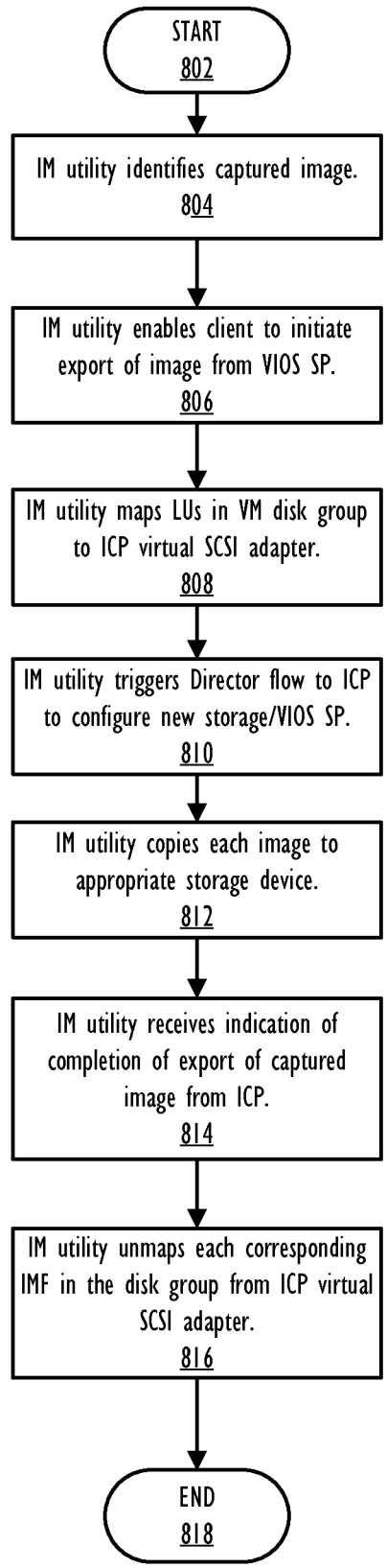
FIG. 8 is a flow chart illustrating the method by which captured file images are exported from the VIOS/Cluster Storage Pool/image management fileset (IMF) by the ICP client, according to one embodiment.

FIG. 8 is a flow chart illustrating the method by which captured file images are exported from the VIOS/Cluster Storage Pool/IMF by the ICP client, according to one embodiment. The method begins at initiator block 802 and proceeds to block 804 at which IM utility 550 identifies a captured image that VIOS/ICP client subsequently exports. At block 806, IM utility 550 enables VIOS to initiate (via ICP client) export of the captured image. At block 808, IM utility 550 initiates a flow to SM 515 to map all the LU(s) in the VM disk group to an ICP virtual SCSI adapter. In particular, SM calls VSP to map LU(s) in the IMF to ICP. At block 810, IM utility 550 initiates a private Director flow to ICP which configures the new storage.

Director agent identifies the storage devices to ICP by UDID. IM utility 550 initiates a copy of each image to the appropriate storage or socket, as shown at block 812. At block 814, IM utility 550 receives an indication that export of the captured image is completed. IM utility 550 initiates a flow to SM 515 to unmap each IMF in the disk group from ICP virtual SCSI adapter, as shown at block 816. Each corresponding image file entry for VA in the database is removed. IM utility 550 detaches and de-allocates all exported image files. The process ends at block 820.

E4. Creation of Virtual Server with VIOS System Pool LU

Figure 9:
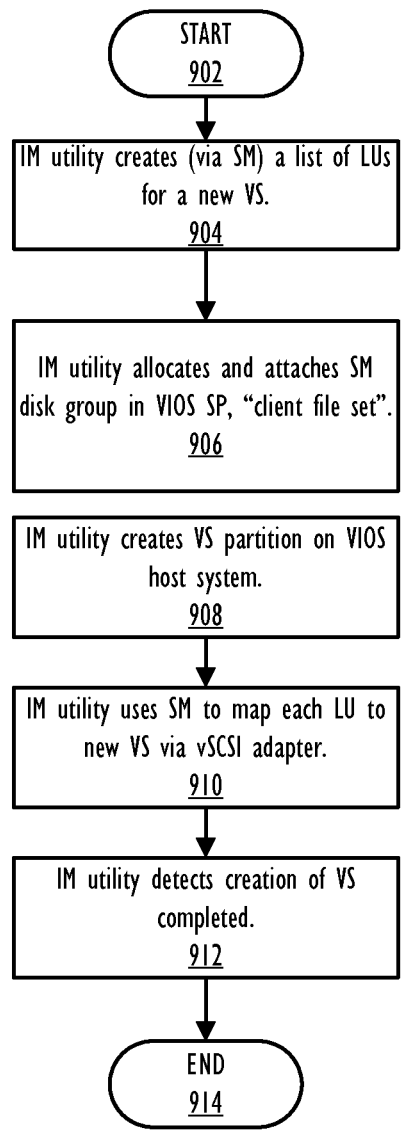
FIG. 9 is a flow chart illustrating the method by which a virtual server (VS) which uses one or more logical units (LU(s)) in the VIOS Cluster/System Pool is created, according to one embodiment.

FIG. 9 is a flow chart illustrating the method by which a virtual server is created which server uses LU(s) in the VIOS cluster System Pool, according to one embodiment. The method begins at initiator block 902 and proceeds to block 904 at which IM utility 550 initiates the creation of a new Virtual Server using VIOS System Pool and associated LU. To initiate the creation of the VS, IM utility 550 uses/calls SM to create (source) a list of LUs for the new VS being created. At block 906, IM utility 550 allocates and attaches a new SM disk group in VIOS Storage Pool. In one embodiment, this new SM disk group is created in the VIOS "client file set". SM uses VSP API to create the LU in the client file set. At block 908, IM utility 550 creates a new VS partition on VIOS host system 100. IM utility 550/SM 515 uses VSP API to map each LU to the new VS via virtual SCSI adapter (vSCSI), as shown at block 910. At block 910, IM utility 550 receives indication that VS creation is completed. The process ends at block 912.

E5. Capture of a List of LU Images to the IMF

An existing running client partition, e.g., a first VS, is associated with a corresponding boot-disk or data-disk. The boot-disk(s)/data-disk(s), which are provisioned from the VIOS cluster storage pool, is captured and ultimately deployed. Director 505 is configured to capture a VM that has one or more LU's. In one embodiment, the first VS is not ended/de-activated in order to be captured. IM utility 550 provides a warning to indicate that the VS is active and is in the process of being captured. In another embodiment, VS is de-activated to enable capture to be completed. In this case, IM utility 550, in conjunction with SM 515, assists the user in mapping and subsequently un-mapping storage from a VS.

Figure 10:
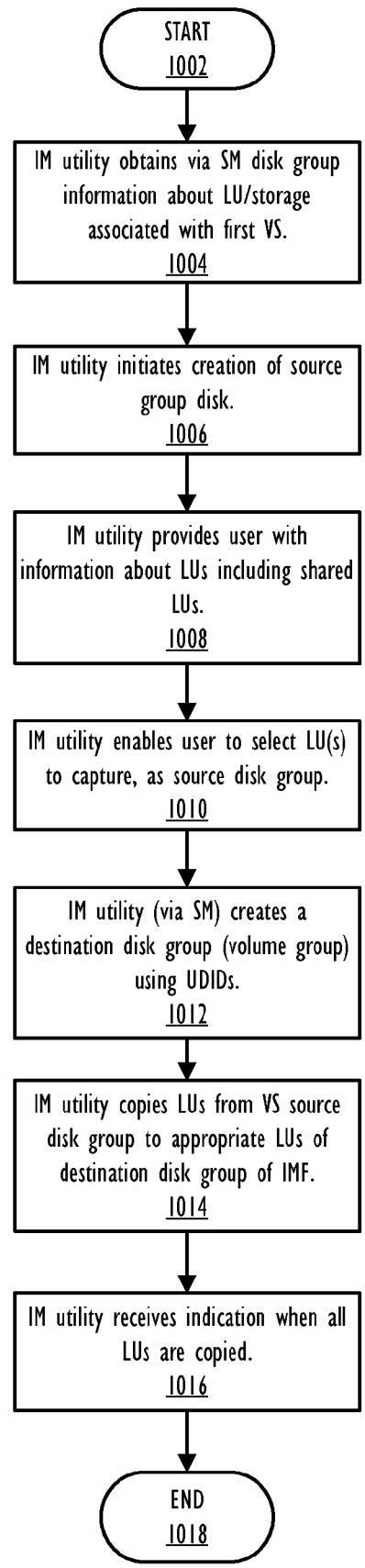
FIG. 10 is a flow chart illustrating the method by which LUs from a list of LU images are captured into the IMF, according to one embodiment.

FIG. 10 is a flow chart illustrating the method by which LUs from a list of LU images are captured into the IMF, according to one embodiment. The method begins at initiator block 1002 and proceeds to block 1004 at which IM utility 550 initiates a flow to SM 515 that returns a disk group (information) of all storage associated with the first VS. At block 1006, IM utility 550 creates a source disk group. If there is one LU, the source disk group is the one LU. IM initiates a flow to SM to check/determine which LU(s) in the disk group are shared with other VS(s). IM displays information indicating the LU(s) with information regarding sharing and, if possible, which LU(s) are data volumes, to allow the user to choose which LU(s) to capture, as shown at block 1008. At block 1010, IM utility 550 determines by interacting with the user which set of LUs are to be copied and which are to be identified as resources in OVF meta data and only mapped to the VM at the time the LU(s) is deployed. LU(s) that are copied comprise a source disk group.

In one embodiment, IM utility 550 receives capture interface parameters when an IM resource feature capture is called from the common layer. These parameters indicate if a subset of the VS LUs is to be captured or if all of the LUs for the VS are to be captured. In one embodiment, IM utility 550 includes an image boot disk within a list of LU's to enable successful capture of the first VS. IM utility 550 initiates Director flow(s) to SM to create one LU in IMF (image file set) for each VS LU in the source disk group, by calling the appropriate VSP API. SM 515 uses a VIOS API to create a destination disk group (volume group) of LU(s) using the UDIDs, as shown at block 1012. IM utility 550 calls SM to initiate a copy of each LU from the VS file set disk group to the appropriate LU in the image file set. VSP 530 provides an API to have SM 515 make the copy. The VIOS is called by VSP 530 to copy a source list LU to a destination list LU. The VIOS takes an instantaneous snapshot of the source list LU and copies the snapshot to the destination list LU, as shown at block 1014.

IM utility 550 receives an indication that the VS LU(s) have been allocated, the VA is copied, and the Software Image objects are created. These processes are similarly done for the import flow described above, as shown at block 1016. The new image file set LU is kept in the database along with the special image handles (for the Software Image) which are returned from SM to allow the handles to be referenced at a late time for deployment or deletion of VA and the corresponding software images. The process ends at block 1018.

E6. Deploy List of Image to New Client Partition as Copy

Figure 11:
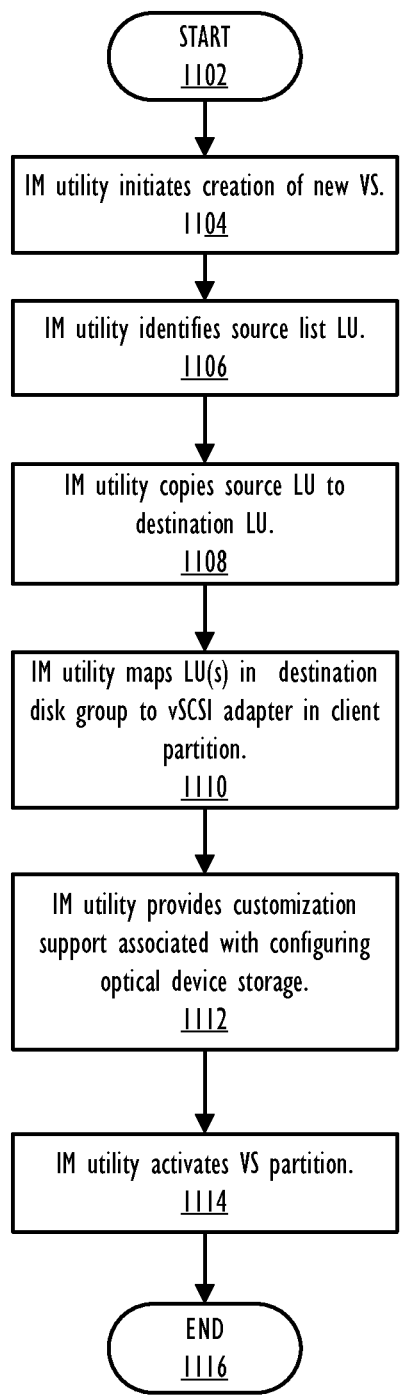
FIG. 11 is a flow chart illustrating the method by which LUs from a list of LU images that represent a virtual machine (VM) in the Image Repository are deployed to a new VS/client partition as a copy of VM storage, according to one embodiment.

FIG. 11 is a flow chart illustrating the method by which LUs from a list of LU images that represent a virtual machine (VM) in the Image Repository are deployed to a new VS/client partition as a copy of VM storage, according to one embodiment. The method begins at initiator block 1102 and proceeds to block 1104 at which IM utility 550 initiates a Director flow to trigger the creation of a new VS. At block 1106, IM utility 550 obtains an LU source list. At block 1108, IM utility 550 calls SM to initiate copying of an LU for each image file in the image file set associated with the VA Software Images being deployed to the new VS. In one embodiment, IM utility 550 copies LUs but does not allocate storage. IM utility 550 copies from the source image an image file set using the special SM handles associated with the source image. The target for the deploy operation is an LU within the "client file set" that was created via a create command for the VS. SM uses VSP API to make the copy. VIOS is called by VSP to copy a source LU to a destination LU. At block 1110, IM utility 550/Director agent 585 initiates a flow to SM to map all the LU(s) in the destination disk group to a virtual SCSI adapter in the client partition. The disk group to map may be a superset of the copied disk group if the OVF references storage resources as part of the VM meta-data. In one embodiment, IM utility 550 provides customization support to enable a user to allocate optical device storage for the VS and attach the allocated storage device to the VS, as shown at block 1112. IM utility 550 copies the customized OVF information to the VIOS allocated storage for that optical device. This information is used by the activation engine in partition activation to customize deployment to the VS. A director agent activates the partition, as shown at block 1114. IM utility 550 is capable of deploying a source list for an Image to an existing client partition via a copy. In this case, since there is an existing partition, IM utility 550 does not create a new VS partition. The process ends at block 1116.

E7. Deploy List of Image to Client Partition as Linked Clone

Figure 12:
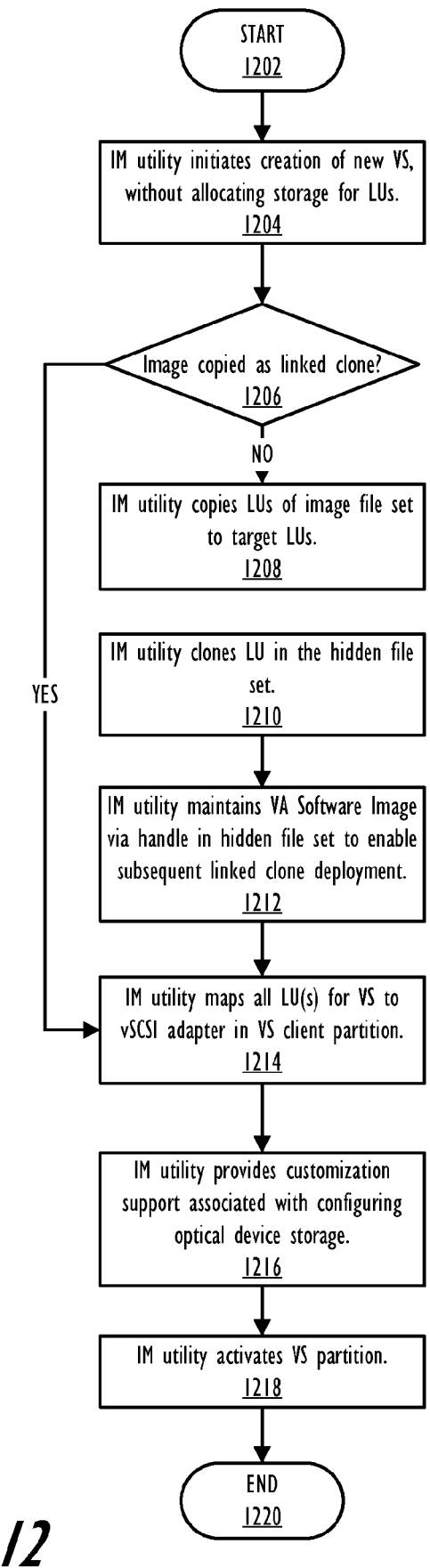
FIG. 12 is a flow chart illustrating the method by which LUs from a list of LU images that represent a virtual machine (VM) in the Image Repository are deployed to a VS/client partition as a linked clone of VM storage, according to one embodiment.

FIG. 12 is a flow chart illustrating the method by which LUs from a list of LU images that represent a virtual machine (VM) in the Image Repository are deployed to a VS/client partition as a linked clone of VM storage, according to one embodiment. IM utility 550 provides/enables deployment of a VM that is in the Image Repository but is not in the Hidden Image Management File set. The method begins at initiator block 1202 and proceeds to block 1204 at which IM utility 550 initiates a flow to begin creating a new VS without allocating any storage for LUs for the VS. At decision block 1206, IM utility 550 determines whether the image to be deployed has already been copied as a linked clone or not. If at decision block 1206 IM utility 550 determines the image has already been deployed as a linked clone (i.e., has a hidden image file set handle in IM database entry for the VA Software Image (the file image set)), then IM utility 550 proceeds to block 1214 at which block IM utility 550 uses SM which uses deployVMD to map all the LU(s) for the VS to a virtual SCSI adapter in the VS client partition. The disk group to map may be a superset of the copied disk group if the OVF references storage resources as part of the VM meta-data. In one embodiment, IM utility 550 calls SM to confirm this LU is really there in the hidden file set and if LU's presence is confirmed LU is not allocated (copied) into the hidden file set since the image file set LU for VA software image has already been copied into the hidden file set. If at decision block 1206, IM utility 550 determines the image has not yet been deployed or copied as a linked clone, IM utility 550 calls SM 515 to copy LUs for the (source) image file set, as shown at block 1208. These LUs are associated with the VA Software Images of the image file set being deployed to the newly created VS. IM utility 550 allocates and copies the source image in image file set using the special SM handle associated with the source image. The target for the deploy operation is the destination LUs within the hidden file set. SM uses VSP API to make the copy. At block 1210, IM utility 550 calls SM to clone (e.g., via copyVMD "retain" call/command) the copied to LU in the hidden file set (hidden image disk group) into the server file set in VIOS Storage Pool. VIOS API clones the LU that is in the hidden file set. In one embodiment, IM utility 550 maintains the VA Software Image via the handle in the hidden file set is to enable another linked clone deploy, as shown at block 1212. In one embodiment, IM utility 550 uses the director agent to create a VM disk group using the UDIDs returned from a successful call to clone the LU. At block 1214, IM utility 550 calls SM to map all the LU(s) for the VS to a virtual SCSI adapter in the VS client partition. The disk group to map may be a superset of the copied disk group if the OVF references storage resources as part of the VM meta-data. IM utility 550 provides customization support to enable a user to allocate optical device storage for the VS and attach as device to the VS, as shown at block 1216. IM utility 550 copies the customized OVF information to the VIOS allocated storage for that optical device. This information is used by the activation engine in partition activation to customize deployment to the VS. A director agent activates the partition, as shown at block 1218. The process ends at block 1220.

E.8 Deployment of a VM that is in the Hidden Image Management File Set

The deployment of a VM that is in the Hidden Image Management file set is described within the above description (i.e., "Deploy list of Image to client partition as Linked Clone."). As described above, IM utility 550 determines whether the hidden file set LU is really present before issuing the call to clone the hidden file set LU. When IM utility 550 determines that the image file set LU for VA Software Image has already been copied into the hidden file set, IM utility 550 does not further allocate/copy LU into the hidden file set.

The above described embodiments are described from the perspective of the management agent operating in conjunction with the VIOS to create a new virtual server client with captured image files from the shared storage pool. More specifically from a device perspective, the embodiments present a data processing system comprising: a processor; and a mechanism for communicatively connecting to a virtual input/output server (VIOS) cluster via a first VIOS on a computing electronic complex. The VIOS cluster comprises a plurality of VIOSes that are cluster aware and a shared VIOS database and wherein the VIOS cluster supports access by one or more virtual server clients to one or more devices within a storage pool of a shared storage repository. The data processing system further comprises a memory coupled to said processor, wherein said memory includes an image management (IM) utility that executes on the processor to perform the functions of: deploying an image capture program (ICP) agent to the first VIOS; discovering, within the VIOS cluster via the ICP agent, one or more of: (a) an image management client; and (b) a virtual storage device; creating a virtual server partition on the CEC, wherein the virtual server partition is associated with the first VIOS; capturing, from within an image repository within the storage pool, an image having one or more files that can be subsequently imported by the first VIOS to the virtual storage device; importing the captured image to the virtual storage device; deploying the imported image to the created virtual server partition; and activating the virtual server partition with the imported image on the CEC.

In one embodiment, the IM utility executing within the data processing system further performs the functions of: obtaining disk group information about one or more logic units (LUs) associated with a first virtual server; initiating creation of a source group disk based on the disk group information; determining whether LUs indicated in the disk group information are shared with other virtual servers; outputting information about LUs indicated in the disk group information, including information about shared LUs; detecting selection of LUs to capture as the source disk group; creating a destination disk volume group using unique device identifiers (UDIDs); and copying LUs from the source disk group to appropriate LUs of the created destination disk group of the image management file (IMF).

According to one embodiment, the functions for importing further comprises functions for: identifying one or more file images to be imported to the virtual storage device; and allocating storage in the virtual storage device based on the one or more image files. The allocating process creates logical units (LUs) within the image management file (IMF) as a volume disk group. The importing function further comprises: configuring LUs in the image management file (IMF) of the virtual storage device for storage of file images; mapping the LUs to the virtual storage device, according to unique image file handlers; mapping LUs to an ICP virtual SCSI adapter; and copying the one or more identified file images to the mapped LUs.

In one embodiment, the CEC comprises a virtualization management component and the functions for deploying further comprises functions for: copying one or more source logical units (LUs) corresponding to image files in the image file set associated with the imported images to destination/target LUs in a client file set that is allocated to the virtual server, according to unique file handles of the imported images; and mapping, via the virtualization management component, the one or more LUs in a destination disk group to a virtual SCSI adapter in the virtual server client partition.

Also, in one embodiment, the IM utility further performs the functions of: initiating creation of a virtual server without allocating storage for logical units (LUs); identifying a file image for deployment to the virtual server; determining whether the file image that is identified for deployment is already copied as a linked clone; in response to the file image not already being copied as a linked clone, copying LUs of a source image file set to LUs of a destination image file set associated with the virtual server; and triggering the first VIOS to initiate exporting of a file image from a VIOS cluster storage pool.

In yet another embodiment, the IM utility further performs the functions of: in response to completion of the copying of LUs of the source image file set to LUs of the destination image file set, cloning LUs of the destination image file set in the hidden file set; maintaining a virtual appliance software image, via one or more handles in the hidden file set, to enable subsequent deployment as a linked clone; and mapping an LU associated with the created virtual server to a vSCSI adapter in the virtual server client partition.

The flow charts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention.

Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having a processor, a memory coupled to the processor, at least one input/output (I/O) adapter that enables connection to an external network with a shared distributed storage repository, and a virtualization management component executing within the data processing system that generates a plurality of operating system (OS) partitions including a first virtual I/O server (VIOS) partition that operates within a VIOS cluster having a shared VIOS database, a method comprising:
 a director server within the VIOS cluster deploying an image capture program (ICP) agent to a first VIOS to trigger discovery of one or more objects that are manageable by the director server;
 discovering, within the VIOS cluster via the ICP agent, a virtual storage device;
 creating a virtual server partition associated with the first VIOS;
 capturing, from an image repository comprising a plurality of images within a storage pool, an image comprising one or more files to be subsequently imported by the first VIOS to the virtual storage device, wherein the storage pool is located within the shared distributed storage repository comprising a plurality of physical storage units distributed across a storage network;
importing the captured image to the virtual storage device;
deploying the imported image to the virtual server partition; and
activating the virtual server partition with the imported image.

2. The method of claim 1, further comprising:
obtaining disk group information about one or more logic units (LUs) associated with a first virtual server;
initiating creation of a source group disk based on the disk group information;
determining whether the one or more LUs indicated in the disk group information are shared with other virtual servers;
outputting information about one or more shared LUs of the one or more LUs indicated in the disk group information;
detecting a selection of the one or more LUs to capture as the source disk group;
creating a destination disk volume group using unique device identifiers (UDIDs); and
copying the one or more LUs from the source disk group to appropriate one or more LUs of the created destination disk volume group of an image management file (IMF).

3. The method of claim 1, wherein said importing further comprises:
identifying one or more file images to be imported to the virtual storage device;
allocating storage in the virtual storage device based on the one or more file images, wherein said allocating creates one or more logical units (LUs) within an image management file (IMF) as a volume disk group;
configuring the one or more LUs in the image management file (IMF) of the virtual storage device for storage of file images;
mapping the one or more LUs to the virtual storage device, according to unique image file handlers;
mapping the one or more LUs to an ICP virtual small computing systems interface (vSCSI) adapter; and
copying the one or more file images to the mapped one or more LUs.

4. The method of claim 1, wherein said deploying the imported image to the created virtual server partition further comprises:
copying one or more source logical units (LUs) corresponding to one or more image files in an image file set that is associated with the imported image to one or more destination/target LUs in a client file set that is allocated to the first VIOS, according to unique file handles of the imported image; and
mapping the one or more source LUs in a destination disk group to a virtual small computing systems interface (vSCSI) adapter in the virtual server partition.

5. The method of claim 1, further comprising:
triggering the first VIOS to initiate exporting of a file image from the storage pool; and
in response to discovering the storage pool, triggering one or more discovery flows, wherein the one of more discovery flows comprises message flows and data flows;
wherein the discovering virtual storage device further comprises discovering an image management client.

6. The method of claim 1, further comprising:
initiating creation of a virtual server without allocating storage for logical units (LUs);
identifying a file image for deployment to the virtual server;
determining whether the file image that is identified for deployment is already copied as a linked clone; and
in response to the file image not already being copied as a linked clone, copying one or more LUs of a source image file set to one or more LUs of a destination image file set associated with the virtual server.

7. The method of claim 6, further comprising:
in response to completion of the copying of the one or more LUs of the source image file set to the one or more LUs of the destination image file set, cloning the one or more LUs of the destination image file set in a hidden file set;
maintaining a virtual appliance software image, via one or more handles in the hidden file set, to enable subsequent deployment of the virtual appliance software image as a linked clone; and
mapping an LU associated with the virtual server to a small computing systems interface (vSCSI) adapter in the virtual server partition.

8. A data processing system comprising:
a processor;
at least one input/output adapter for communicatively connecting to a virtual input/output server (VIOS) cluster via a first VIOS on a computing electronic complex (CEC), wherein the VIOS cluster comprises a shared VIOS database and a plurality of cluster aware VIOSes, and wherein the VIOS cluster supports access by one or more virtual server clients to one or more devices within a storage pool of a shared distributed storage repository; and
a memory coupled to said processor, wherein said memory includes an image management (IM) utility that executes on the processor to:
deploy, via a director server within the VIOS cluster, an image capture program (ICP) agent to the first VIOS to trigger discovery of one or more objects that are manageable by the director server;
discover, within the VIOS cluster via the ICP agent, one or more of: a virtual storage device;
create a virtual server partition on the CEC, wherein the virtual server partition is associated with the first VIOS;
capture, from an image repository comprising a plurality of images within the storage pool, an image comprising one or more files to be subsequently imported by the first VIOS to the virtual storage device, wherein the shared distributed storage repository comprises a plurality of physical storage units distributed across a storage network;
importing the captured image to the virtual storage device;
deploying the imported image to the virtual server partition; and
activating the virtual server partition with the imported image on the CEC.

9. The data processing system of claim 8, wherein the IM utility further performs functions to:
obtain disk group information about one or more logic units (LUs) associated with a first virtual server;
initiate creation of a source group disk based on the disk group information;
determine whether the one or more LUs indicated in the disk group information are shared with other virtual servers;

output information about one or more shared LUs of the one or more LUs indicated in the disk group information;

detect a selection of the one or more LUs to capture as the source disk group;

create a destination disk volume group using unique device identifiers (UDIDs); and copy the one or more LUs from the source disk group to appropriate one or more LUs of the created destination disk volume group of an image management file (IMF).

10. The data processing system of claim 8, wherein said functions for importing further comprises functions to:

identify one or more file images to be imported to the virtual storage device;

allocate storage in the virtual storage device based on the one or more file images, wherein said allocating creates one or more logical units (LUs) within an image management file (IMF) as a volume disk group;

configure the one or more LUs in the image management file (IMF) of the virtual storage device for storage of file images;

map the one or more LUs to the virtual storage device, according to unique image file handlers;

map the one or more LUs to an ICP virtual small computing systems interface (vSCSI) adapter; and copy the one or more file images to the mapped one or more LUs.

11. The data processing system of claim 8, wherein the CEC comprises a virtualization management component and said functions for deploying the imported image to the created virtual server partition further comprises functions to:

copy one or more source logical units (LUs) corresponding to one or more image files in an image file set that is associated with the imported image to one or more destination/target LUs in a client file set that is allocated to the first VIOS, according to unique file handles of the imported image; and map, via the virtualization management component, the one or more source LUs in a destination disk group to a virtual small computing systems interface (vSCSI) adapter in the virtual server partition.

12. The data processing system of claim 8, wherein the IM utility further performs functions to:

initiate creation of a virtual server without allocating storage for logical units (LUs);

identify a file image for deployment to the virtual server;

determine whether the file image that is identified for deployment is already copied as a linked clone;

in response to the file image not already being copied as a linked clone, copy one or more LUs of a source image file set to one or more LUs of a destination image file set associated with the virtual server;

trigger the first VIOS to initiate exporting of a file image from the storage pool; and in response to discovering the storage pool, trigger one or more discovery flows, wherein the one of more discovery flows comprises message flows and data flows;

wherein the discovering virtual storage device further comprises discovering an image management client.

13. The data processing system of claim 12, wherein the IM utility further performs functions to:

in response to completion of the copying of the one or more LUs of the source image file set to the one or more LUs of the destination image file set, cloning the one or more LUs of the destination image file set in a hidden file set;

maintaining a virtual appliance software image, via one or more handles in the hidden file set, to enable subsequent deployment of the virtual appliance software image as a linked clone; and mapping an LU associated with the virtual server to a virtual small computing systems interface (vSCSI) adapter in the virtual server partition.

14. A computer program product comprising:

a non-transitory computer storage medium; and program code on said non-transitory computer storage medium that when executed by a processor within a data processing system provides the functions of:

deploying, via a director server within the VIOS cluster, an image capture program (ICP) agent to a first virtual input/output server (VIOS) of a VIOS cluster to trigger discovery of one or more objects that are manageable by the director server, wherein the VIOS cluster comprises a shared VIOS database and a plurality of cluster aware VIOSes, and wherein the VIOS cluster supports access by one or more virtual server clients to one or more devices within a storage pool of a shared distributed storage repository, and wherein the first VIOS exists on a computing electronic complex (CEC);

discovering, within the VIOS cluster via the ICP agent, a virtual storage device;

creating a virtual server partition on the CEC, wherein the virtual server partition is associated with the first VIOS;

capturing, from an image repository comprising a plurality of images within the storage pool, an image comprising one or more files that to subsequently imported by the first VIOS to the virtual storage device, wherein the shared distributed storage repository comprises a plurality of physical storage units distributed across a storage network;

importing the captured image to the virtual storage device;

deploying the imported image to the virtual server partition; and activating the virtual server partition with the imported image on the CEC.

15. The computer program product of claim 14, further comprising program code for:

obtaining disk group information about one or more logic units (LUs) associated with a first virtual server;

initiating creation of a source group disk based on the disk group information;

determining whether the one or more LUs indicated in the disk group information are shared with other virtual servers;

outputting information about one or more shared LUs of the one or more LUs indicated in the disk group information;

detecting a selection of the one or more LUs to capture as the source disk group;

creating a destination disk volume group using unique device identifiers (UDIDs); and copying the one or more LUs from the source disk group to appropriate one or more LUs of the created destination disk volume group of an image management file (IMF).

16. The computer program product of claim 14, wherein said program code for importing further comprises program code for:

identifying one or more file images to be imported to the virtual storage device;

allocating storage in the virtual storage device based on the one or more file images, wherein said allocating creates one or more logical units (LUs) within an image management file (IMF) as a volume disk group;

configuring the one or more LUs in the image management file (IMF) of the virtual storage device for storage of file images;

mapping the one or more LUs to the virtual storage device, according to unique image file handlers;

mapping the one or more LUs to an ICP virtual small computing systems interface (vSCSI) adapter; and copying the one or more file images to the mapped one or more LUs.

17. The computer program product of claim 14, wherein said program code for deploying the imported image to the created virtual server partition further comprises program code for:

copying one or more source logical units (LUs) corresponding to one or more image files in an image file set that is associated with the imported image to one or more destination/target LUs in a client file set that is allocated to the first VIOS, according to unique file handles of the imported image; and mapping the one or more source LUs in a destination disk group to a virtual small computing systems interface (vSCSI) adapter in the virtual server partition.

18. The computer program product of claim 14, further comprising program code for:

initiating creation of a virtual server without allocating storage for logical units (LUs);

identifying a file image for deployment to the virtual server;

determining whether the file image that is identified for deployment is already copied as a linked clone;

in response to the file image not already being copied as a linked clone, copying one or more LUs of a source image file set to one or more LUs of a destination image file set associated with the virtual server;

triggering the first VIOS to initiate exporting of a file image from the storage pool; and in response to discovering the storage pool, triggering one or more discovery flows, wherein the one of more discovery flows comprises message flows and data flows;

wherein the discovering virtual storage device further comprises discovering an image management client.

19. The computer program product of claim 14, further comprising program code for:

in response to completion of the copying of the one or more LUs of the source image file set to the one or more LUs of the destination image file set, cloning the one or more LUs of the destination image file set in a hidden file set;

maintaining a virtual appliance software image, via one or more handles in the hidden file set, to enable subsequent deployment of the virtual appliance software image as a linked clone; and mapping an LU associated with the virtual server to a small computing systems interface (vSCSI) adapter in the virtual server partition.

* * * * *